Jan. 28, 1969  O. VAUGHN  3,424,026
TORQUE AMPLIFIER

Filed July 7, 1966  Sheet _1_ of 4

Owen Vaughn
INVENTOR.

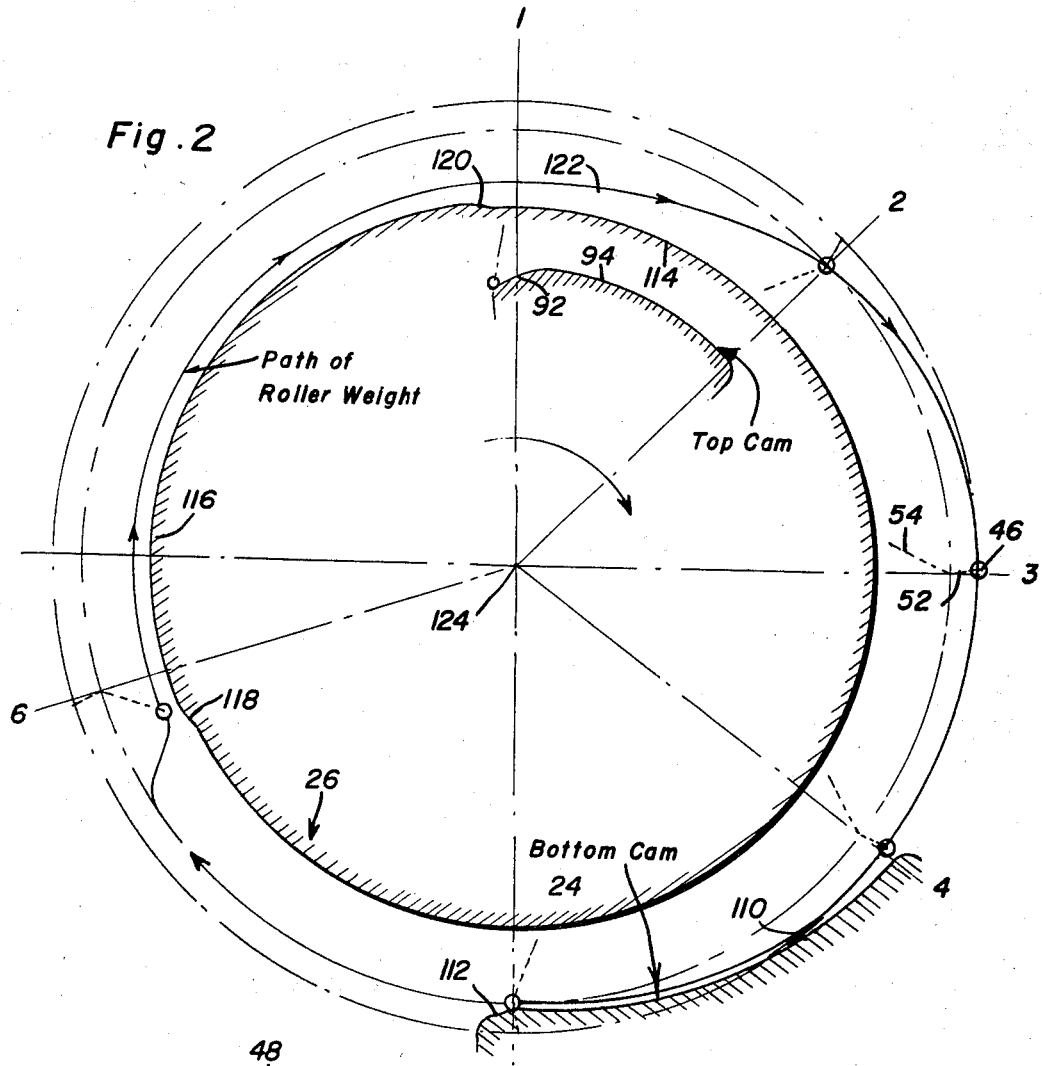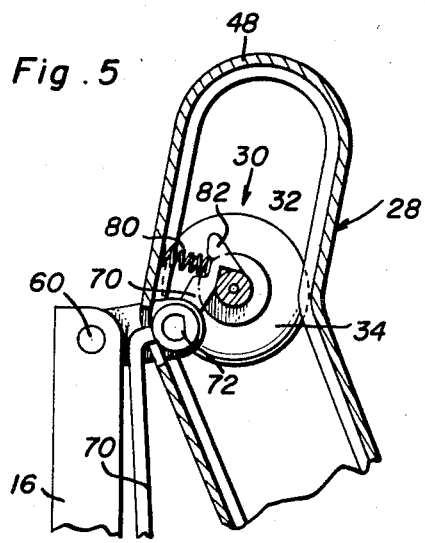

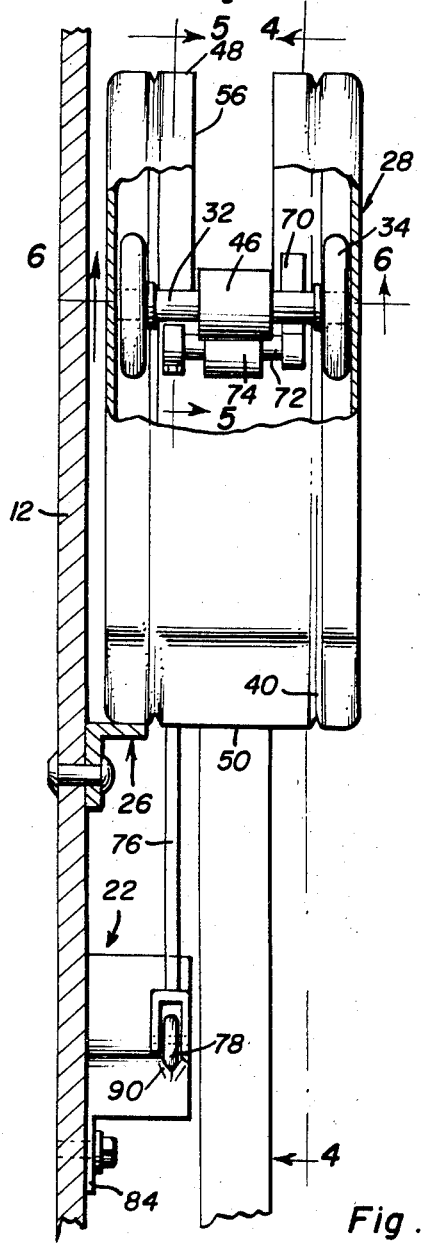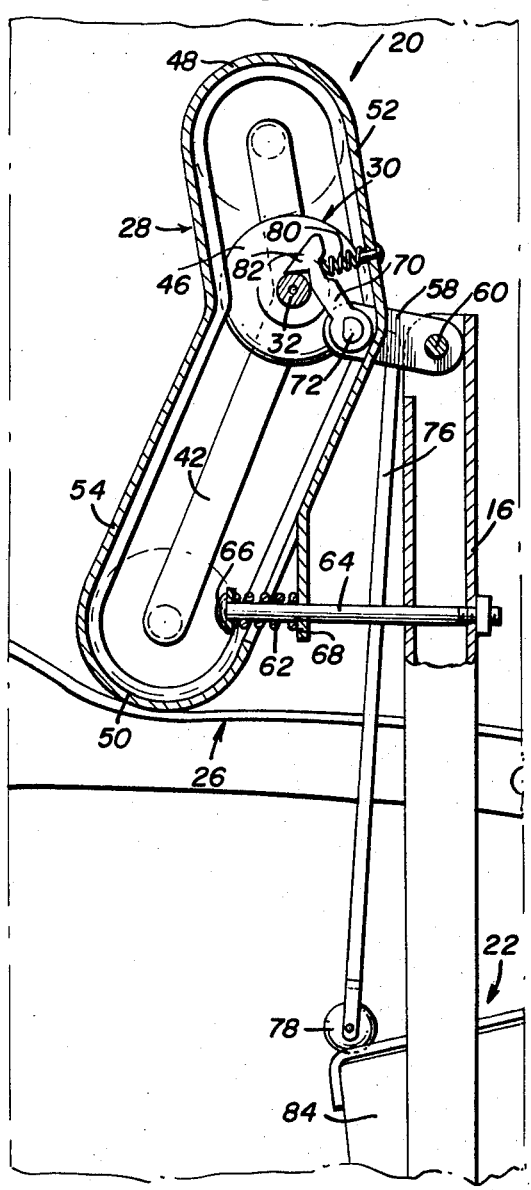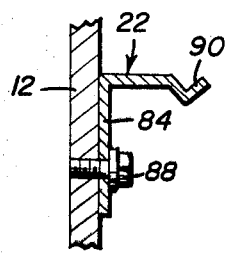
Owen Vaughn
INVENTOR.

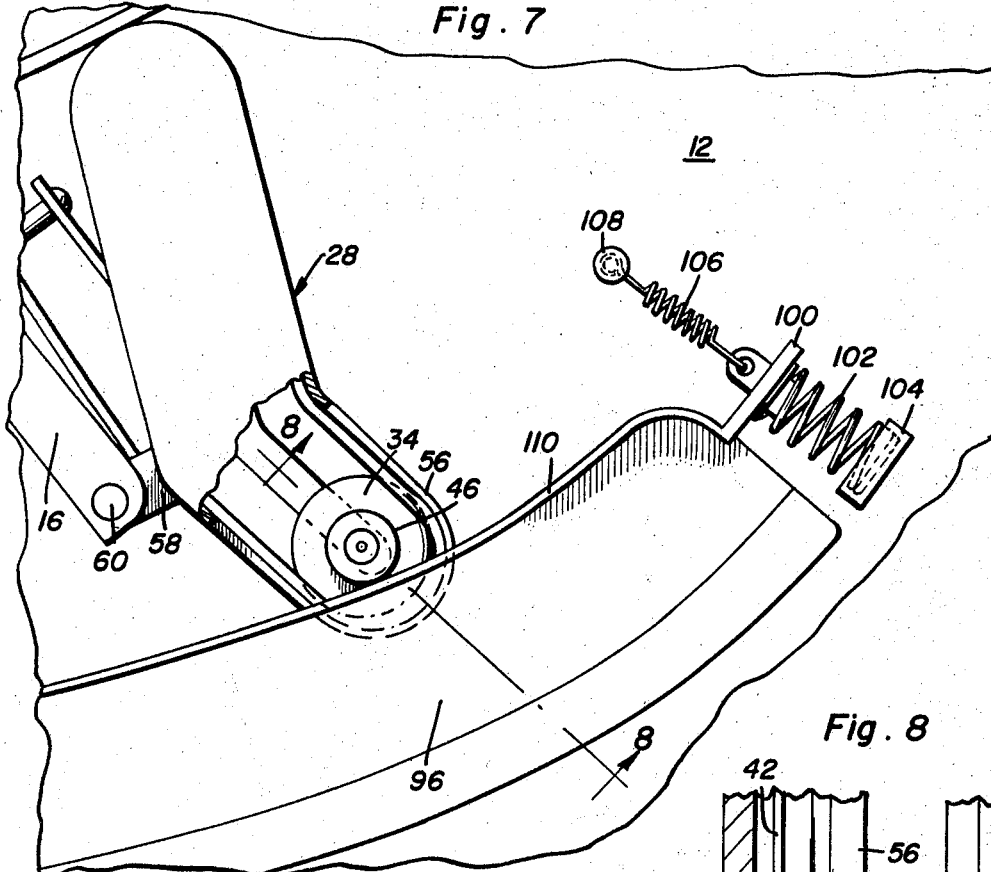
Fig. 7
Fig. 8
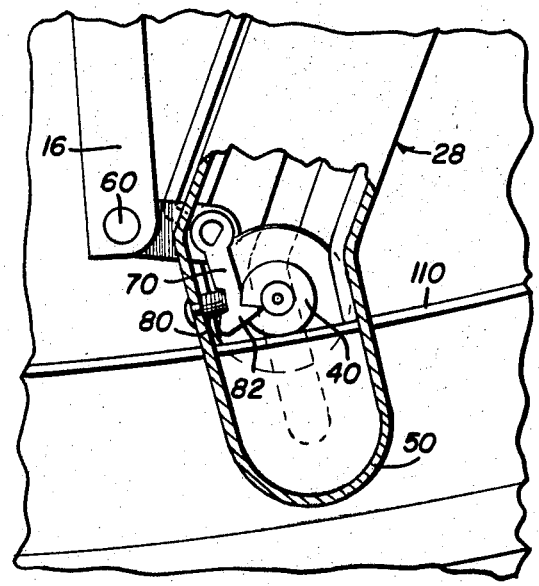
Fig. 9
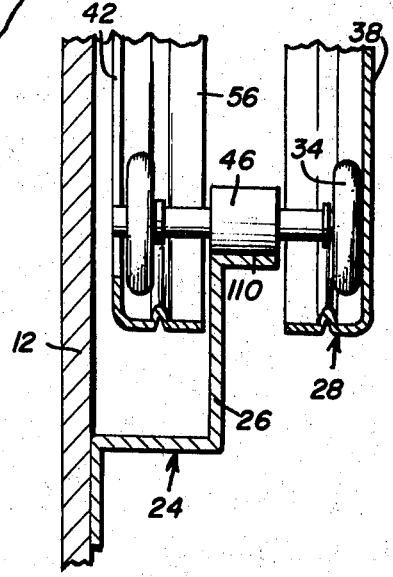
Owen Vaughn
INVENTOR.

United States Patent Office 3,424,026
Patented Jan. 28, 1969

3,424,026
TORQUE AMPLIFIER
Owen Vaughn, P.O. Box 533, Chickasha, Okla. 73018
Filed July 7, 1966, Ser. No. 563,533
U.S. Cl. 74—572                                    10 Claims
Int. Cl. G05g *1/08, 3/00*

ABSTRACT OF THE DISCLOSURE

A flywheel assembly through which mechanical power is transmitted in such a manner as to produce instantaneous increases in torque by cyclically changing the center of mass of a rotor during its rotation. Shiftable inertia weights are slidably and pivotally mounted on the rotor toward this end. Movement of said weights is influenced by centrifugal forces and control cams rendered operative in response to rotation of the rotor.

---

This invention relates to rotor or flywheel assemblies and more particularly to a rotor having a mass distribution which is cyclically varied in order to utilize gravitational and centrifugal forces for improving the torque output characteristics of a power driven member.

In accordance with the present invention, a rotor assembly is provided consisting of a plurality of radial spokes to which shiftable weight devices are pivotally connected at the radially outer ends. The weight devices guidingly enclose relatively massive roller elements constituting inertia weights which move along a controlled path in response to rotation of the rotor assembly in order to increase the gravitational moment on the rotor during a predetermined phase of rotation.

It is therefore an important object of the present invention to provide a rotor assembly wherein inertia roller elements are guided for movement relative to a track member pivotally connected to the radially outer end of a spoke element forming part of a rotor assembly. The track member guides the roller element along two track sections between radially inner and radially outer limit positions, the track sections being disposed at a predetermined angle to each other and controllably orientated relative to the radial spoke to which it is pivotally connected.

In accordance with the foregoing object, an additional object of the present invention is to provide a rotor assembly having adjustable cam facilities for controlling the orientation of the track members relative to the radial spokes on which they are mounted as well as a cam retractor for displacing the roller element relative to its track member during a limited phase of the rotational movement of the spoke member.

A still further object in accordance with the foregoing objects is to provide a rotor assembly wherein roller elements guided for movement within track members pivotally connected to rotor spokes, are latched in intermediate positions between radially inner and radially outer limit positions during a limited phase of spoke movement. In this fashion, the gravitational moment or radial distance of the roller element from its rotational center is controlled during a limited phase of movement without imposing any external reaction force on the rotor assembly.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 2 is a diagrammatic illustration showing the cam contours, track member positions and path of movement of the roller weight elements.

FIGURE 3 is an enlarged side sectional view of a portion of the rotor assembly.

FIGURE 4 is a sectional view taken substantially through a plane indicated by section line 4—4 in FIGURE 3.

FIGURE 5 is a partial sectional view taken substantially through a plane indicated by section line 5—5 in FIGURE 3.

FIGURE 7 is an enlarged partial front elevational view of a portion of the rotor assembly.

FIGURE 8 is a partial sectional view taken substantially through a plane indicated by section line 8—8 in FIGURE 7.

FIGURE 9 is an enlarged partial front elevational view with parts broken away and shown in section of another portion of the rotor assembly.

FIGURE 10 is an enlarged partial sectional view taken substantially through a plane indicated by the section line 10—10 in FIGURE 1.

Figure 1:
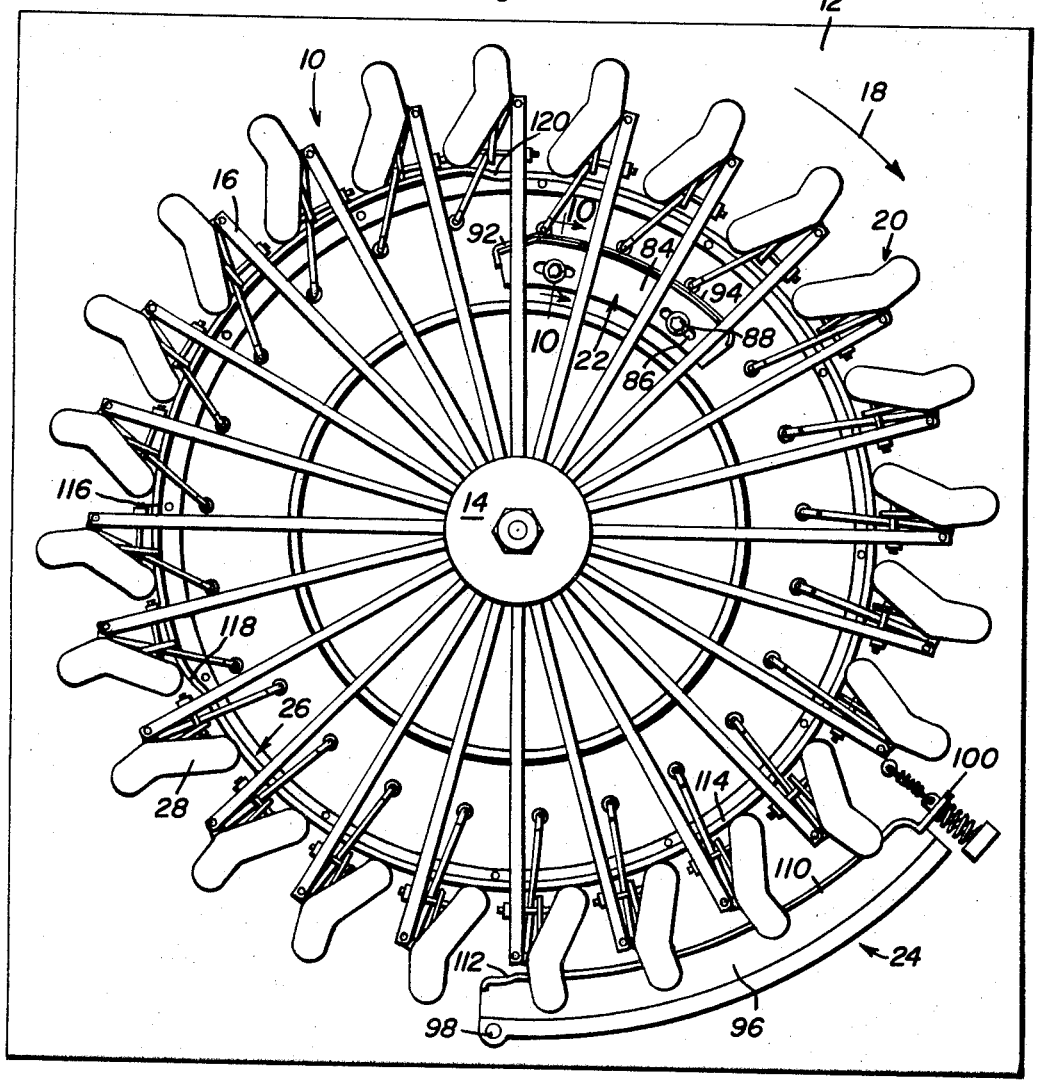
FIGURE 1 is a front elevational view of a rotor assembly constructed in accordance with the present invention including the control facilities.

Referring now to the drawings in detail, FIGURE 1 shows a rotor assembly generally denoted by reference numeral 10 constructed in accordance with the present invention. The rotor assembly is mounted for rotation about a fixed axis which is substantially horizontal and is associated with control facilities mounted on any suitable stationary frame such as the plate 12. The rotor assembly includes a driven hub 14 to which a plurality of radial spokes 16 are connected for rotation in one direction as indicated by the arrow 18. Each spoke carries at its radially outer end, a shiftable weight device generally referred to by reference numeral 20. The control facilities mounted on the plate 12 operatively engage the shiftable weight devices 20 in response to rotation of the radial spokes 16 by the hub 14 to which they are connected. The control facilities include an adjustable latch releasing cam assembly 22, a weight retracting cam assembly 24 and a position varying cam 26, said cam assemblies performing functions to be hereafter described.

Figure 6:
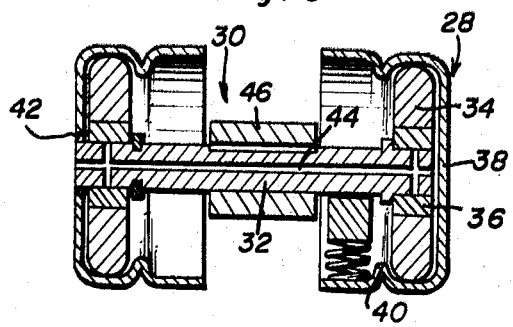
FIGURE 6 is a transverse sectional view taken substantially through a plane indicated by section line 6—6 in FIGURE 3.

Referring now to FIGURES 3, 4 and 6 in particular, it will be observed that each of the shiftable weight devices 20 includes a track housing member 28 within which a roller assembly 30 is guidingly mounted. The roller assembly 30 includes a roller shaft 32 rotatably mounting roller elements 34 on bearings 36 adjacent the opposite axial ends. The rollers 34 are guided for movement within the track housing 28 between the side walls 38 and ribs 40. A slot 42 may be formed in one of the side walls through which one axial end of the shaft 32 is exposed so that lubricant for the bearings 36 and the track formations may be introduced into the bore 44 formed in the shaft. Also connected to the shaft 32 for rotation therewith, is a relatively massive weight element 46. Thus, the roller assembly 30 is movable within the track housing 28 between radially outer and radially inner limit positions respectively defined by the curved end walls 48 and 50 of the housing. The radially outer end wall 48 forms part of a track section 52 of the track housing member which is disposed at an angle to a radially inner track section 54 terminated by the end wall 50. A central slot 56 is formed in the radially outer track section 52 for purposes to be hereafter explained. Also, the track member housing is provided with a projecting ear 58 at the intersection between the radially outer and radially inner track sections 52 and 54 so that the track housing may be pivotally connected by the pivot pin 60 to the radially outer end of a spoke member 16.

As more clearly seen in FIGURE 4, the track housing 28 is yieldably held in a predetermined angular position relative to its radial spoke member 16 by means of a spring element 62 mounted on a bolt 64 that extends from the spoke member. The spring 62 reacts between the head portion 66 of the bolt and an extension 68 of the housing through which the bolt extends. It will therefore be apparent that the respective track sections 52 and 54 will deviate at different angles from the radial line extending through the spoke member from the rotational center of the rotor assembly, the amount of deviation being varied against the bias of the spring element 62 by means of the position varying cam 26 secured in any suitable fashion to the frame 12.

Also mounted within the track housing 28, is a latch element 70. The latch element is connected to one end of a pivot shaft 72 mounted for angular displacement within the track housing by means of the journal projection 74, the other end of the shaft 72 being connected to a follower rod 76 which extends outwardly from the track housing and radially inwardly toward the center of the rotor assembly at an angle to the spoke member 16. A follower roller 78 may be rotatably mounted at the radially inner end of the follower rod for engagement with the adjustable latch release cam assembly 22. The latch element 70 and the follower rod 76 connected thereto by the pivot shaft 72, are yieldably biased to one angular position by means of a spring element 80 as shown in FIGURE 4 so that the hook end 82 of the latch element may engage the roller shaft 32 to limit radially outward movement of the roller assembly to an intermediate position between the track sections 54 and 52.

The latch releasing cam assembly 22 as shown in FIGURES 1, 4 and 10, includes a mounting portion 84 having slots 86 through which the cam assembly is secured in an angularly adjusted position to the frame plate 12 by means of the fasteners 88. A V-shaped cam track 90 extends from the mounting portion 84 and receives the follower roller 78 associated with the follower rod 76 to which the latch element 70 is connected as aforementioned. It will therefore be apparent, that as each weight device 20 approaches a top position, its follower rod 76 engages the displacing portion 92 of the cam track so as to angularly displace the latch element 70 to a release position permitting radially outward movement of the roller assembly past its intermediate position. The latch element is held in its release position for a sufficient angular distance by means of the dwell portion 94 of the cam track until the roller assembly has passed the hook end 82 of the latch element during its radially outward travel under the influence of centrifugal force.

The roller assembly is displaced radially inwardly during a limited phase of movement by means of the retracting cam assembly 24 as shown in FIGURES 1, 7, 8 and 9. The cam assembly 24 includes a cam member 96 which is pivoted to the plate 12 by means of the pivot pin 98 adjacent its lower end. The opposite end of the cam member is provided with a projection 100 engaged by a compression spring 102 extending from a spring seat 104 secured to the plate 12. A tension spring 106 is also anchored at one end to an anchor 108 secured to the plate 12 and at its opposite end to the extension 100 so that the cam member 96 will be spring centered in both angular directions in order to reduce impact forces exerted thereon. The cam member includes a cam track portion 110 which extends into each track housing 28 through the slot 56 for engagement with the weight element 46 associated with the roller assembly. It will be apparent therefore, that the cam track 110 will displace the roller assembly radially inwardly from its radially outer limit position toward the intermediate position. As the roller assembly approaches the intermediate position under the influence of the cam track 110, it engages the hook end 82 of the latch element to cam it toward its release position against the bias of the spring 80 as shown in FIGURE 9. When the roller assembly reaches the intermediate position, the latch element 70 relatches. In order to eliminate the impact imposed on the latch element by the roller assembly as it leaves the influence of the cam track 110, a gradual drop off portion 112 is provided adjacent the lower terminal end portion of the cam track as shown in FIGURE 1. Thus, as the weight device 20 leaves the cam assembly 24, the latch element 70 is gradually loaded by the roller assembly 30 to subsequently prevent radially outward movement of the roller assembly from the intermediate position to which it is displaced by the cam assembly 24.

When the weight device 20 is not under the influence of either the cam assembly 22 or cam assembly 24, the position assumed by the roller assembly within the track housing 28 will depend upon gravitational and centrifugal forces, the relative angular relationship between the track sections 52 and 54 and the pivotal position of the track housing on the radial spoke member to which it is connected. In order to obtain the optimum angular position for the track housing for the purposes of the present invention, the cam member 26 is provided having a radially inner cam surface portion 114 and a radially outer cam surface portion 116 engageable with the radially inner end wall 50 of the track housing 28. Accordingly, as each track housing 28 approaches a horizontal position, it engages a displacing portion 118 of the cam 26 to abruptly downwardly displace the track housing relative to its spoke member producing radially inward movement of the roller assembly. Again, when the track housing approaches the upper position it engages the displacing portion 120 of the cam 26 to pivotally displace the track housing toward its spoke member in order to advance the effective phase position at which centrifugal force will outwardly displace the roller assembly. Accordingly, before the roller assembly is radially outwardly displaced under the influence to centrifugal force, the latch element 70 is displaced to its release position by means of the cam assembly 22 as aforementioned.

From the foregoing description, operation of the rotor assembly and the control exercised over the distribution of mass will be apparent. With respect to each weight device 28, it will therefore be apparent that the weight element 46 will travel along the path 122 as diagrammatically shown in FIGURE 2. It will be noted therefore that the weight element 46 will be at a greater radial distance from the rotational center 124 of the rotor assembly during downward travel since the came assembly 22 will have released the latch element so that it may move radially outwardly under the influence of centrifugal force and remain in the radially outward limit position until the roller assembly is engaged by the cam assembly 24 causing it to move radially inwardly to its intermediate position. When the roller assembly reaches its intermediate position at the lower phase position of the track housing, it is relatched so that it can no longer move radially outwardly after it leaves the cam assembly 24. The weight element then moves radially inwardly as the track housing is pivotally displaced by the portion 118 of the cam 26. Thus, during most of its upward movement, the weight element is at its closest radial distance to the rotational center 124.

What is claimed as new is as follows:

1. A torque amplifying rotor assembly connected to a drive member comprising, at least one radial spoke connected to said drive member, a track member movably mounted on the spoke having a weight element shiftable therein, and cam means operatively engageable with said track member and the weight element for varying the distribution of mass of the rotor assembly in response to rotation of the drive member.

2. A torque amplifying rotor assembly connected to a drive member comprising, a plurality of radial spokes connected to said drive member, a plurality of shiftable weight devices connected to the respective spokes, and cam means operatively engageable with said weight devices for varying the distribution of mass of the rotor assembly in response to rotation of the drive member, each of said weight devices comprising, a track member having radially inner and outer sections at an angle to each other, means pivotally connecting the track member to one of the spokes between said sections thereof, roller means guidingly mounted by the track member for movement in response to gravitational and centrifugal forces exerted thereon during rotation of the drive member, and latch means mounted by the track member for preventing radially outward movement of the roller means from the inner track section into the outer track section.

3. The combination of claim 2 wherein said cam means includes, an actuating element connected to the latch means, release means engageable by the actuating element for displacement of the latch means permitting movement of the roller means into the outer section of the track member and retracting means engageable with the roller means for radially inward displacement thereof from the outer section into latching engagement with the latch means.

4. The combination of claim 3 wherein said cam means further includes means engageable with the track member for changing the angular position thereof relative to the spoke associated therewith.

5. A torque amplifying rotor assembly connected to a drive member comprising, a plurality of radial spokes connected to said drive member, a plurality of shiftable weight devices connected to the respective spokes, and cam means operatively engageable with said weight devices for varying the distribution of mass of the rotor assembly in response to rotation of the drive member, said cam means including means engageable with a track member for changing the angular position thereof relative to the spoke associated therewith.

6. The combination of claim 5, wherein each track member has radially inner and outer sections at an angle to each other, means pivotally connecting the track member to one of the spokes between said section thereof, roller means guidingly mounted by the track member for movement in response to gravitational and centrifugal forces exerted thereon during rotation of the drive member, and latch means mounted by the track member for preventing radially outward movement of the roller means from the inner track section into the outer track section.

7. In a rotor assembly having a drive member rotatable about a fixed axis, a weight device pivotally connected to the drive member having an element movable therein and means for displacing said element in response to rotation of the drive member comprising, means for displacing the weight device relative to the drive member to vary gravitational and centrifugal forces exerted on the element during rotation of the drive member, means for displacing the element relative to the weight device and latch means responsive to said displacement of the element relative the weight device for temporarily resisting said forces exerted on the element.

8. The combination of claim 7 including release means engageable with the latch means to permit movement of the element under the influence of centrifugal force.

9. In a rotor assembly having a drive member rotatable about a fixed axis, a weight device pivotally connected to the drive member having an element movable therein and means for displacing said element in response to rotation of the drive member comprising, means for increasing the radial distance of the element from said fixed axis under the influence of centrifugal force to increase gravitational torque exerted on the drive member, means for retracting the element to a reduced radial distance from the fixed axis and latch means for holding the element in a retracted position to reduce the gravitational torque loading on the drive member.

10. The combination of claim 9 including means for varying the position of the weight device on the drive member to enhance the influence of centrifugal force on the element during said increase in the radial distance thereof from the fixed axis.

References Cited

UNITED STATES PATENTS

| 1,748,108 | 2/1930 | Chalmers | 74—64 |
| 2,366,637 | 1/1945 | Mejean et al. | 74—64 |

MILTON KAUFMAN, *Primary Examiner.*